Patented Dec. 15, 1931

1,836,620

UNITED STATES PATENT OFFICE

LEO ROSENTHAL, OF VOHWINKEL, NEAR ELBERFELD, AND WALTER KROPP, OF ELBERFELD, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

WOOD OIL LACQUER

No Drawing. Application filed February 27, 1930, Serial No. 431,961, and in Germany November 30, 1926.

The present invention relates to new compositions of matter, more particularly it relates to wood oil lacquers.

We have found that very valuable non-skinning lacquers, including varnishes, from wood oil or containing wood oil are prepared by adding thereto a small quantity of an aralkylated phenol, such as benzylnaphthol or benzylphenol. The quantity of the aralkylated phenol added may vary within the widest limits, generally our new compositions contain about 0.5 to 5% thereof, but it is of course understood that the invention is not restricted thereto and that one may depart from the limits stated without departing from the spirit of our invention.

Our new lacquers are not liable to skinning. They yield a completely clear coat and dry with a high luster and hard elasticity.

The following examples serve to illustrate our invention without limiting it thereto, the parts being by weight:—

*Example 1.*—4 parts of 1-benzyl-2-naphthol and 1 part of the cobalt salt of linoleic acid are dissolved in 100 parts of wood oil while heating; a non-skinning varnish is thus obtained drying within about 6 hours to form a clear lustrous hard elastic film without wrinkles.

*Example 2.*—25 parts of calcium resinate are molten together with 50 parts of wood oil, the mass is diluted with 30 parts of oil of turpentine and then 2 parts of a mixture of ortho- and para-benzylphenol and 0.5 part of the cobalt salt of linoleic acid are dissolved in the mass while still warm. Thus a non-skinning lacquer is obtained drying within 5 hours when coated and yielding a clear, lustrous and extremely resistant film.

In the annexed claims the term "wood oil lacquer" is intended to include also wood oil varnishes as well as lacquers or varnishes containing wood oil.

We claim:—

1. As a new composition of matter a wood oil lacquer containing a small quantity of an aralkylated phenol.

2. As a new composition of matter a wood oil lacquer containing about 0.5 to 5% of an aralkylated phenol.

3. As a new composition of matter a wood oil lacquer containing a small quantity of a benzylated phenol.

4. As a new composition of matter a wood oil lacquer containing about 0.5 to 5% of a benzylated phenol.

In testimony whereof, we affix our signatures.

LEO ROSENTHAL.
WALTER KROPP.